United States Patent
Hayashi

(10) Patent No.: US 9,168,566 B2
(45) Date of Patent: Oct. 27, 2015

(54) PROCESS FOR PRODUCING A PROJECTION BLACKBOARD

(71) Applicant: JFE METAL PRODUCTS & ENGINEERING INC., Tokyo (JP)

(72) Inventor: Kazuhiro Hayashi, Tokyo (JP)

(73) Assignee: JFE METAL PRODUCTS & ENGINEERING INC., Tokyo (JP)

( * ) Notice: Subject to any disclaimer, the term of this patent is extended or adjusted under 35 U.S.C. 154(b) by 250 days.

(21) Appl. No.: 13/849,986

(22) Filed: Mar. 25, 2013

(65) Prior Publication Data

US 2013/0216715 A1 Aug. 22, 2013

Related U.S. Application Data

(62) Division of application No. 12/065,510, filed as application No. PCT/JP2005/021772 on Nov. 28, 2005, now Pat. No. 8,470,451.

(30) Foreign Application Priority Data

Sep. 2, 2005 (JP) ................................. 2005-254586

(51) Int. Cl.
  *B05D 3/02* (2006.01)
  *B43L 1/04* (2006.01)
  *B43L 1/10* (2006.01)
  *G03B 21/60* (2014.01)

(52) U.S. Cl.
  CPC .................. *B05D 3/0209* (2013.01); *B43L 1/04* (2013.01); *B43L 1/10* (2013.01); *G03B 21/60* (2013.01); *Y10T 428/12535* (2015.01); *Y10T 428/12618* (2015.01); *Y10T 428/12993* (2015.01)

(58) Field of Classification Search
  CPC ............ B05D 3/0209; B43L 1/04; B43L 1/10; G03B 21/60
  USPC ................................................ 427/376.4, 380
  See application file for complete search history.

(56) References Cited

U.S. PATENT DOCUMENTS

4,123,590 A * 10/1978 Hasegawa et al. ............. 428/450
6,476,964 B1 * 11/2002 Gypen ........................... 359/443
2003/0194498 A1* 10/2003 Hayashi et al. ............. 427/376.2

FOREIGN PATENT DOCUMENTS

DE 2749402 5/1979
JP 57-183190 A 11/1982
(Continued)

OTHER PUBLICATIONS

Machine Translation, Duck, DE 2749402, May 1979.

*Primary Examiner* — Alexander Weddle
(74) *Attorney, Agent, or Firm* — Young & Thompson

(57) ABSTRACT

A projection blackboard having both of an excellent blackboard function and an excellent screen function, and a process for producing the same. The surface enamel layer that is an outermost layer of the enamel layers is formed by using a enameling upper glaze wherein at least titanium oxide coated particles, or a titanium oxide glaze together therewith is blended into a transparent mat glaze, so as to render the layer an enamel layer having a predetermined color tone, a surface characteristic that the Rz is from 5 to 25 μm and a reflective characteristic that the peak gain is 0.28 or more, or having these properties and a glossiness Gs (75°) of 1 to 30%. This makes it possible to produce a blackboard excellent in both of blackboard function and screen function. The titanium oxide coated particles are preferably particles wherein surfaces of mica particles are coated with titanium oxide.

20 Claims, 1 Drawing Sheet

(56) References Cited

FOREIGN PATENT DOCUMENTS

| JP | 6-74390 A | 10/1994 |
| JP | 2000-273657 A | 10/2000 |
| JP | 2001-342581 A | 12/2001 |
| JP | 2002-6399 | 1/2002 |
| WO | 02/37409 | 5/2002 |

* cited by examiner

PROCESS FOR PRODUCING A PROJECTION BLACKBOARD

TECHNICAL FIELD

The present invention relates to a blackboard (also referred as chalk board) having an enamel layer on its surface, in particular, an enamel blackboard having both of an excellent blackboard function and an excellent screen function. The wording "excellent blackboard function" referred to in the present invention means that a blackboard has a function that characters, pictures or the like are easily written/drawn thereon with a chalk and are easily watched, and the written/drawn characters, pictures or the like thereon are easily erased. The "excellent screen function" means that a blackboard has a function that when images of characters or the like are projected thereon through a projector, an OHP or the like, the images of the characters or the like can be clearly projected.

BACKGROUND ART

Hitherto, blackboards (chalk boards) have a function that characters, pictures or the like are erasably written/drawn on the surface thereof with a chalk, and have been used to assist various explanations, lectures, speeches or the like. Thus, in conventional blackboards (chalk boards) as prescribed in JIS S 6007, the surface thereof has appropriately roughness in order that characters, pictures or the like can easily be written/drawn with a chalk or can easily be erased, and further dark color material has been used for the surface thereof in order that the written/drawn characters, pictures or the like can easily be watched.

In recent years, however, it has been become general that various projectors such as lantern slides or OHPs are used to project materials prepared in advance onto a screen and then an explanation is made while either one of the projected images is pointed with a pointer or the like. In the case of making an explanation or the like using various projectors, it is necessary to prepare both of a projecting screen and a blackboard, on which characters or the like can be written/drawn with a chalk and can be erased to make a supplementary explanation and thus, considerably much time is required for the arrangement thereof and the settlement thereof. The reason therefor is as follows: when images are projected to a conventional blackboard with any one of various projectors, the quality of the projected images are dark and unclear, thus, no conventional blackboard has been used as a screen.

On the other hand, in reflection screens, a main object of which is that images through various projectors is projected thereon, material in white color or a highly bright color is used therefore in order to improve the reflective property. Accordingly, when writing or drawing is made onto such a screen with a chalk (which chalk), a low contrast is given. Thus, the recognizable property of characters, pictures or the like decreases. Ordinary screens such as beads or white mats have a low surface hardness; thus, when writing or drawing is made thereon with a chalk (white chalk) and the resultant is erased, a problem that the screens are worn away is caused. Therefore, as disclosed in Japanese Patent Application Laid-Open (JP-A) No. 02-153080 and Japanese Patent Application Laid-Open (JP-A) No. 04-229299, screens are not used as chalk boards although the screens are used as marker boards, on which writing or drawing with a marker and erasing are made.

Against such problems, for example, Japanese Utility Model Application Laid-Open (JP-U) No. 57-183190 suggests an enamel blackboard which is also used as a projecting screen, having a rough-surface enamel layer on its surface which informed on a steel sheet using a glaze containing a blue dye and have a brightness of 4 to 8 on a steel sheet.

DISCLOSURE OF THE INVENTION

Problems to be Solved by the Invention

However, the blackboard produced by the technique described in Japanese Utility Model Application Laid-Open (JP-U) No. 57-183190, has low reflective luminance and shows a tendency to give an unclear image. In particular, in the case of using a projector giving a low luminance, a clear image can hardly be obtained on that black board. In such a way, there remain problems that the blackboard cannot satisfy recent properties required for a screen sufficiently. An object of the present invention is to solve the above-stated problems in the prior art favorably and provide a projection blackboard having both of an excellent blackboard function and an excellent screen function, on which characters, pictures or the like are easily written/drawn with a chalk and are easily watched so as to give an excellent chalk-character-recognizable property, on which characters, pictures or the like written/drawn with a chalk can easily be erased to give an excellent chalk-character-writable/drawable/erasable property besides an excellent chalk-character-recognizable property, and on which projected images can be clearly screened to give an excellent projected-image-recognizable property; and a producing process thereof. The projection blackboard which is a target of the present invention is an enamel blackboard having one or more enamel layers on an outer surface of a metallic substrate.

Means for Solving the Problems

In order to attain the object stated above, the inventors have made eager investigations on factors producing effects onto the chalk-character-recognizable property, the chalk-writable/drawable/erasable property, and the projected-image-recognizable property of an enamel blackboard. As a result, the inventors have found out that it is important to prepare a surface enamel layer of a blackboard in such a manner that: the surface enamel layer has a brightness in a predetermined range and a surface roughness in a predetermined range to keep certainly chalk-character-recognizable property, chalk-character-writable/drawable/erasable property which are equal to or more than those of conventional blackboards; and further the layer has such a reflective property that the layer has a peak gain not lower than a predetermined value in order to improve the projected-image-recognizable property.

It has been newly found out that such a surface enamel layer can be produced by using a glaze to be used a glaze wherein at least an appropriate amount of titanium oxide coated particles, or a titanium oxide glaze together therewith is blended into a transparent mat glaze, which is an ordinary chalk board glaze, and by adjusting the firing conditions into an appropriate range. It has been found out that this manner makes it possible to cause a blackboard to have both of an excellent blackboard function and an excellent screen function.

On the basis of the finding stated above, the present invention has been made by the addition of a further investigation thereto.

Accordingly, the subject matters of the present invention are as follows:

(1) A projection blackboard, comprising one or more enamel layers on a metallic substrate, wherein a surface enamel layer that is an outermost layer of said one or more enamel layers has a color tone that the brightness V prescribed in JIS Z 8721-1993 is from 3.0 to 7.0, a surface characteristic that the surface roughness Rz prescribed in JIS B 0601-2001 is from 5 to 25 µm, and a reflective characteristic that the peak gain is 0.28 or more.

(2) The projection blackboard according to item (1), wherein said surface enamel layer is an enamel layer formed by using of an enameling upper glaze wherein at least titanium oxide coated particles, optionally a titanium oxide glaze together therewith, or a transparent gloss glaze together with the two is blended into a transparent mat glaze.

(3) The projection blackboard according to item (1) or (2), wherein the surface enamel layer has any one of black, green and brown colors.

(4) The projection blackboard according to any one of items (1) to (3), wherein the surface enamel layer has a 75-degree mirror plane glossiness Gs (75°) of 1 to 30%, the Gs (75°) being prescribed in JIS Z 8741-1997.

(5) The projection blackboard according to any one of items (1) to (4), wherein the titanium oxide coated particles are particles wherein surfaces of mica particles are coated with titanium oxide.

(6) A process for producing an projection blackboard, wherein: an enameling lower glaze is coated onto a surface of a metallic substrate and the resultant is fired to form an underlying enamel layer, or no underlying enamel layer is formed; an enameling upper glaze in which at least titanium oxide coated particles, a titanium oxide glaze together therewith, or a transparent gloss glaze together with the two is blended into a transparent mat glaze is then coated thereon; and the resultant is fired at 400 to 800° C. to form a surface enamel layer.

(7) The process for producing a projection blackboard according to item (6), wherein the metallic substrate is a cold-rolled steel sheet, an aluminum plated steel sheet, or a Zn—Al alloy plated steel plate.

(8) The process for producing a projection blackboard according to item (6) or (7), wherein the titanium oxide coated particles are particles wherein surfaces of mica particles are coated with titanium oxide.

Advantageous effects of the invention

According to the present invention, it is possible to produce, at low costs, a projection blackboard which is excellent in chalk-character-recognizable property, chalk-character-erasable property, and image-recognizable property, is easily handled and is also excellent in constructability. Thus, industrially advantageous effects are remarkably produced.

Figure 1:
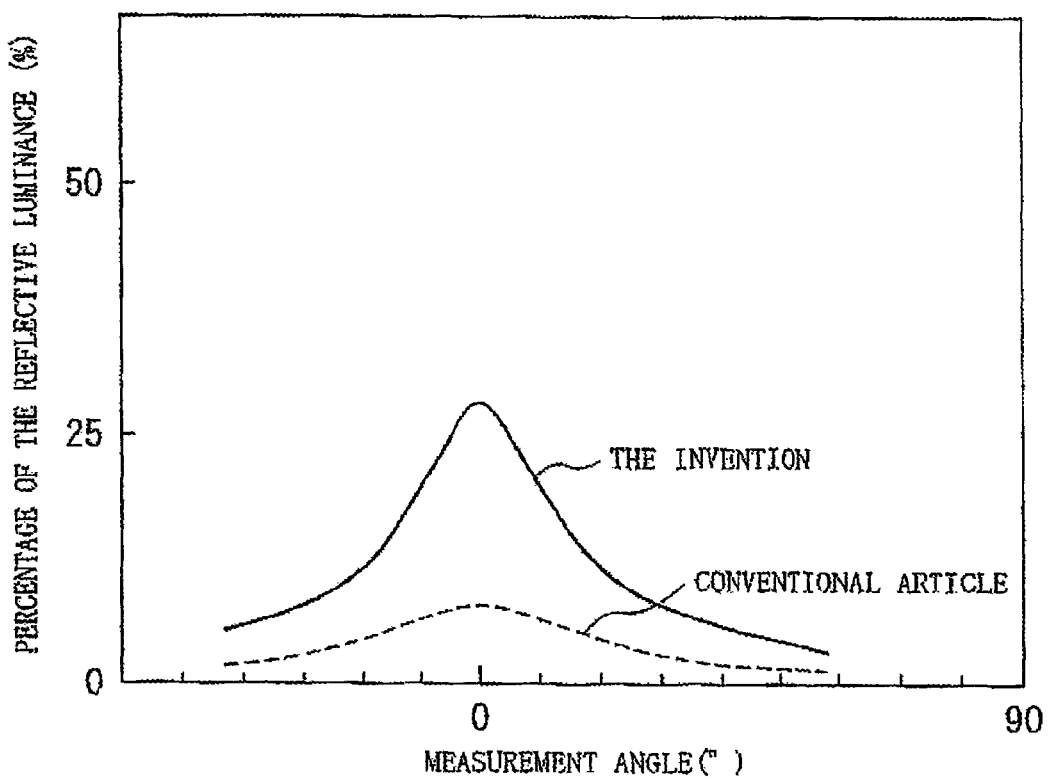
FIG. 1 is a graph showing examples of reflective characteristic curves.

DESCRIPTION OF REFERENCE NUMERALS 1 incident light
2 reflected light
3s blackboard to be measured (sample)
10 light source
11 luminance meter

BEST MODE FOR CARRYING OUT THE INVENTION

The projection blackboard according to the present invention is a blackboard having one or more enamel layers on a metallic substrate. In the present invention, the kind of the used metallic substrate is not particularly limited. The substrate is preferably a cold-rolled steel sheet. It is preferred to plate the cold-rolled steel sheet used as the metallic substrate with Ni in order to improve the adhesive property of the metallic substrate to a glaze. Examples of the cold-rolled steel sheet include a low-carbon steel sheet and a stainless steel sheet. The C content in the low-carbon steel sheet is preferably 0.0200% or less by mass, more preferably 0.0100% or less by mass, even more preferably 0.0050% or less by mass.

The metallic substrate may be an aluminum plated steel sheet or a Zn—Al alloy plated steel sheet. Examples of the Zn—Al alloy plated steel sheet include a plated steel sheet having a plating layer consisted of 4 to 70% by mass of Al and the balance made of Zn and inevitable impurities. It is needless to say that an additive for improving a property of the plated coat may be included into the plating layer.

The surface enamel layer that is an outermost layer out of the enamel layers formed on the metallic substrate has a color tone that the brightness V prescribed in JIS Z 8721-1993 is from 3.0 to 7.0, a surface characteristic that the surface roughness Rz prescribed in JIS B 0601-2001 is from 5 to 25 µm, and a reflective characteristic that the peak gain is 0.28 or more. The brightness V referred to in the present invention is a value measured in accordance with a color-measuring method prescribed in JIS Z 8722-2000 and represented by a color-representing method prescribed in JIS Z 8721-1993.

The projection blackboard of the present invention is first required to have a chalk-character-recognizable property and chalk-character-erasable property which are equal to or more than those of conventional blackboards, so as to keep an excellent blackboard function.

For this purpose, in the present invention, the surface enamel layer is first rendered a surface enamel layer having a color tone that the brightness V prescribed in JIS Z 8721-1993 is from 3.0 to 7.0 and the layer is preferably in any one of black, green, brown and dark blue, more preferably in a dark color selected from black, green or brown. If the brightness V falls down from the above-mentioned range, the blackboard becomes too dark so that the projected-image-recognizable property deteriorates when images are projected thereon. On the other hand, if the brightness V rises up from the range, the blackboard becomes too bright so that the chalk-character-recognizable property deteriorates. The color tone and the brightness of the enamel layer can be adjusted by the kind of the pigment(s) to be added, or the added amount thereof. In order to adjust the brightness V into the range of 3.0 to 7.0, it is preferred to add, as one or more pigments, a metal Co, Cr or Ti, or oxides thereof alone or in combination of two or more thereof. The brightness V is preferably from 4.0 to 6.0.

In the projection blackboard of the present invention, the surface characteristic of the surface enamel layer is adjusted in such a manner that the surface roughness Rz prescribed in JIS B 0601-2001 is turned into the range of 5 to 25 µm in order to keep certainly a chalk-character-writable/drawable/erasable property, which is a property that characters, pictures or the like are easily written/drawn with a chalk and are easily erased. The surface roughness is preferably from 10 to 22 µm, more preferably from 14 to 18 µm.

If the surface roughness Rz of the surface enamel layer gets out of the range and the surface approximates a plain surface, a chalk slides thereon so that the chalk-writable/drawable property deteriorates and further the projected-image-recognizable property deteriorates. On the other hand, if the roughness gets out of the above-mentioned range and the irregularities become too large, the chalk-character-erasable property declines and further the projected-image-recognizable property declines. As will be described later, the surface property of the above-mentioned surface enamel layer can be attained by setting a combination of the composition of the glaze to be coated on the metallic substrate and the firing conditions after the glaze is coated into an appropriate range.

In the projection blackboard of the invention, the surface enamel layer has the above-mentioned color tone and surface characteristic to maintain an excellent blackboard function, and further has a reflective characteristic that the peak gain is 0.28 or more, and preferably the half gain is 15 or more.

As shown in, for example, FIG. 2, the reflective characteristic of a sheet to be measured is obtained from a reflective characteristic curve (see FIG. 1) gained as follows: incident light 1 is radiated from a light source 10 perpendicularly to the center of a plate 3s to be measured; and a luminance meter 11 is used to measure the intensity of reflected light 2 (reflective luminance) at each of points shifted right-handedly and left-handedly in the range of 75°, respectively, from the central point at intervals of 5° on the arc of a single circle. The "peak gain" referred to in the present invention means the ratio of the reflective luminance of a blackboard to be measured which is measured when light is radiated onto the blackboard to that of a standard whiteboard (perfect diffusion plate: a purely white plate, on which barium sulfate is baked) measured under the same conditions. In this case, the reflective luminance at a viewing angle of 5° is usually used. The "half gain" referred to in the present invention means the viewing angle width (degree(s)) when the reflective luminance becomes ½ of that at the peak in the reflective characteristic curve.

If the peak gain is less than 0.28, projected images are dark so that the projected-image-recognizable property becomes poor. As a result, the blackboard cannot satisfy requirements for a projection blackboard. Thus, the lower limit of the peak gain is set to 0.28. The peak gain is preferably from 0.5 to 1.0. In order to obtain a wide viewing angle, the half gain is preferably set to 15 or more. For this reason, in the present invention, the surface enamel layer is rendered a surface enamel layer having a reflective characteristic of which has a peak gain of 0.28 or more and preferably a half gain of 15 or more.

As will be described later, the above-mentioned reflective characteristic of the surface enamel layer can be attained by: adding, to a glaze to be coated onto the metallic substrate, an appropriate amount of titanium oxide coated particles, preferably mica particles coated with titanium oxide, having an appropriate particle diameter distribution; and adjusting the firing temperature into an appropriate range.

The surface enamel layer having the above-mentioned characteristics preferably has such a surface gloss that the 75-degree mirror plane glossiness Gs (75°) is from 1 to 30%, the Gs (75°) being prescribed in JIS Z 8741-1997. If the Gs (75°) is less than 1%, the chalk-character-erasable property deteriorates and further the reflective luminance becomes small so that projected images get unclear. On the other hand, if the Gs (75°) is more than 30%, the chalk-character-writable/drawable property deteriorates and further halation is easily caused to make the viewing angle narrow. The Gs (75°) is more preferably from 15 to 25%.

The surface enamel layer contains titanium oxide coated particles. The containing of the titanium oxide coated particles into the surface enamel layer causes an improvement in the clearness, and causes the formation of irregularities into the surface to improve the diffusion reflectivity. Thus, halation is restrained so as to improve the reflective characteristic. In the present invention, the titanium oxide coated particles are contained in the surface enamel layer preferably in an amount of 2 to 40% by mass of the whole of the surface enamel layer, more preferably in an amount of 3 to 20% by mass thereof. If the amount of the titanium oxide coated particles is less than 2% by mass, the reflective characteristic improving effect is small. If the amount of the titanium oxide coated particles is more than 40% by mass, the surface roughness Rz becomes excessively large so that the chalk-character-erasable property deteriorates. Additionally, the brightness becomes too large so that the chalk-character-recognizable property decreases.

The titanium oxide coated particles preferably have an average particle diameter of 100 μm or less, and more preferably have that of 5 to 80 μm. If the average particle diameter of the titanium oxide coated particles is less than 5 μm, the diffusion reflectivity falls. On the other hand, if the average particle diameter of the titanium oxide coated particles is more than 100 μm, the surface roughness of the surface enamel layer becomes excessively large so that the chalk-character-erasable property decreases. The average particle diameter of the particles referred to herein means the 50% cumulated particle diameter measured by use of a laser diffraction type particle size distribution measuring device. The titanium oxide coated particles are preferably particles wherein surfaces of mica particles are coated with titanium oxide. The mica particles are preferably thin-plate-form mica particles.

The surface enamel layer having the above-mentioned properties are preferably an enamel layer formed by using an enameling upper glaze obtained by blending, into a transparent mat glaze, at least titanium oxide coated particles, optionally a titanium oxide glaze together therewith, or a transparent gloss glaze together with the two. The thickness of the surface enamel layer is preferably 200 μm or less from the viewpoint of the peel property thereof. The thickness is more preferably 150 μm or less.

The surface enamel layer formed by using the enameling upper glaze stated above is preferably a enamel layer containing: $TiO_2$, which is total amount of titanium oxide including titanium oxide in the titanium oxide coated particles: 0.5 to 15% by mass, more preferably 0.5 to less than 10% by mass, more preferably 2 to 5% by mass; $SiO_2$: 15 to 45%; $Al_2O_3$: 5 to 30%; the total of one or more selected from $Na_2O$, $K_2O$ and $Li_2O$: 2 to 20% by mass; and $B_2O_3$: 2 to 20% by mass. In the present invention, it is needless to say that the enamel layer of the blackboard contains one or more pigments selected from black pigments, green pigments, and yellow pigments in a total amount of 20% or less by mass in order to give a desired color.

The following will describe a preferred process for producing the projection blackboard of the present invention.

The projection blackboard of the invention is preferably produced by a producing process wherein: an enameling lower glaze is coated onto a surface of a metallic substrate and the resultant is fired to form an underlying enamel layer, or no underlying enamel layer is formed; an enameling upper glaze in which at least titanium oxide coated particles, optionally a titanium oxide glaze together therewith, or a transparent gloss glaze together with the two is blended into a transparent mat glaze is then coated thereon; and the resultant is fired at 400 to 850° C. to form a surface enamel layer. The metallic substrate is preferably a cold-rolled steel sheet, an aluminum plated steel sheet, or a Zn—Al plated steel sheet.

When a cold-rolled steel sheet is used as the metallic substrate, it is preferred to plate the cold-rolled steel sheet with Ni, coat an enameling lower glaze on a surface of the cold-rolled steel sheet (the metallic substrate), and fire the resultant to form an underlying enamel layer. The enameling lower glaze is not particularly limited, and is preferably any enameling lower glaze that is used in conventional enamel blackboards. For the coating of the enameling lower glaze, any known coating manner may be used, example thereof including spray and a roll coater.

In particular, the enameling lower glaze is preferably, for example, a $SiO_2$ based glaze comprising $SiO_2$: 20-80%, and the balance composed of $TiO_2$: 0-15%, $ZrO_2$: 0-20%, $B_2O_3$: 0-25%, $Al_2O_3$: 0-25%, $Na_2O$: 0-20%, $Li_2O$: 0-20%, $K_2O$: 0-20%, PbO: 0-40%, ZnO: 0-50%, BaO: 0-15%, CaO: 0-15%, $CaF_2$: 0-10%, CoO: 0-20%, NiO: 0-20%, MnO: 0-20%, and so on, each "%" representing % by mass relative to the basis of the whole of solid contents therein.

An enameling upper glaze is coated on the surface of the resultant underlying enamel layer, and subsequently the resultant is fired at 600 to 850° C. to form a surface enamel layer. For the coating of the enameling upper glaze, any known coating manner may be used, example thereof including spray and a roll coater.

The enameling upper glaze is preferably a glaze wherein an appropriate amount of titanium oxide coated particles are added to a transparent mat glaze (frit) or to a glaze wherein 100 to 20 parts by weight of a titanium oxide glaze (frit) or 20 parts or less by weight of a transparent gloss glaze (frit) together therewith is added to 100 parts by weight of a transparent mat glaze (frit). The added amount of the titanium oxide coated particles is preferably from 1 to 25 parts by weight for 100 parts by weight (a value converted to weight after the firing) of the transparent mat glaze or the mixed glaze (slip).

The enameling upper glaze is obtained by adding/mixing an appropriate amount of powder of titanium oxide coated particles to/with a slip obtained by grinding a mixture of: a frit of a transparent mat glaze, or a transparent mat glaze, a titanium oxide glaze, or further a frit of a transparent gloss glaze; optional various additives and one or more optional pigments; and water. It is necessary to add any one of black pigment, green pigment, and yellow pigment or a combination of two or more thereof, as the pigment(s), in accordance with a desired color tone of the blackboard. The total added amount of the pigment(s) is preferably 20 parts or less by weight for 100 parts by weight (a value converted to weight after the firing) of the slip. If the added amount is more than 20 parts by weight so that the amount of the pigment(s) becomes large, the fluidity of the slip decreases.

The transparent mat glaze (frit) is preferably a glaze comprising $SiO_2$: 30-45%, $Al_2O_3$: 20-35%, $B_2O_3$: 5-15%, $K_2O$: 5-15%, $Na_2O$: 10-25%, and the balance composed of BaO: 0-15%, CaO: 0-15%, $F_2$: 0-10%, $TiO_2$: 0-10%, and so on, each "%" representing % by mass relative to the basis of the whole of solid contents therein.

The titanium oxide glaze (frit) is preferably a glaze comprising 10 to 30% of $TiO_2$ and the balance composed of $SiO_2$: 0-80%, $Al_2O_3$: 0-20%, $B_2O_3$: 0-25%, $Na_2O$: 0-20%, $K_2O$: 0-20%, $Li_2O$: 0-20%, $P_2O_5$: 0-10%, $ZrO_2$: 0-20%, BaO: 0-15%, CaO: 0-15%, MgO: 0-5%, PbO: 0-40%, ZnO: 0-50%, $CaF_2$: 0-10%, and so on, each "%" representing % by mass relative to the basis of the whole of solid contents therein. Instead of titanium oxide, which is a pigment of the titanium oxide glaze, one or more pigments out of zirconium oxide, antimony oxide and zinc oxide may be used.

The transparent gloss glaze (frit) is preferably a glaze comprising $SiO_2$: 40-65%, and the balance composed of $B_2O_3$: 5-20%, one or more out of $Na_2O$, $K_2O$ and $Li_2O$: 5-40% in total, $F_2$: 0-10%, $Al_2O_3$: 0-10%, CaO: 0-10%, $TiO_2$: 0-10%, ZnO: 0-10%, MgO: 0-5%, and so on, each "%" representing % by mass relative to the basis of the whole of solid contents therein. Instead of titanium oxide, which is a pigment of the titanium oxide glaze, one or more pigments out of zirconium oxide, antimony oxide and zinc oxide may be used.

If the firing temperature is lower than 600° C., the surface roughness becomes too rough so that the reflective characteristic deteriorates. On the other hand, if the temperature is higher than 850° C., the surface becomes too flat and smooth so that the chalk-character-recognizable property and the chalk-character-writable/drawable/erasable property decline.

In the case of using, as the metallic substrate, an aluminum plated steel sheet or a Zn—Al alloy plated steel sheet, it is preferred to coat an enameling upper glaze onto a surface of the metallic substrate and fire the resultant at 400 to 600° C. to form a surface enamel layer.

In this case, it is necessary to use an enameling upper glaze having a low melting point to prevent the plating layer from being melted. It is therefore preferred to use an enameling upper glaze wherein titanium oxide coated particles or a titanium oxide glaze together therewith is blended into a glaze wherein phosphoric acid is blended instead of the above-mentioned transparent mat glaze. The phosphoric acid content by percentage in the glaze into which phosphoric acid is blended is 40% or more by mass and is preferably 80% or less by mass, more preferably 70% or less by mass.

The glaze (frit) into which phosphoric acid is blended is preferably a glaze comprising $P_2O_5$: 40-80%, and the balance composed of $SiO_2$: 0-40%, $Al_2O_3$: 0-50%, $B_2O_3$: 0-25%, $Na_2O$: 0-20%, $K_2O$: 0-20%, $Li_2O$: 0-20%, $TiO_2$: 0-30%, $Sb_2O_3$: 0-25%, ZnO: 0-20%, BaO: 0-15%, CaO: 0-15%, MgO: 0-5%, PbO: 0-10%, SrO: 0-20%, and so on, each "%" representing % by mass relative to the basis of the whole of solid contents therein.

In the case of using, as the metallic substrate, an aluminum plated steel sheet or a Zn—Al alloy plated steel sheet, an enameling upper glaze having a low melting point is used to prevent the plating layer from being melted; thus, the adhesiveness is improved so that it is not necessarily essential to coat the enameling lower glaze.

Moreover, in the case of using, as the metallic substrate, an aluminum plated steel sheet or a Zn—Al alloy plated steel sheet, the adhesiveness of the enamel layer decreases if the firing temperature is lower than 400° C. On the other hand, if the temperature is higher than 600° C., a problem that the plating layer is melted is caused.

EXAMPLES

Example 1

A cold-rolled steel sheet (an extremely low carbon steel sheet containing C: 0.0050% by mass) was used as each metallic substrate. A nickel plating layer was formed on each surface of the cold-rolled steel sheet in a nickel sulfate bath. Next, an enameling lower glaze was coated onto each surface of the cold-rolled steel sheet, which was plated with the nickel, in a roll coater manner. Thereafter, the resultant was fired at 800° C. to form an underlying enamel layer 30 μm in thickness. The used enameling lower glaze was a glaze obtained by charging, into a ball mill, a blend material wherein clay: 6 parts by weight, magnesium carbonate: 0.15 part by weight, borax: 0.4 part by weight, silica: 1 part by weight, and water: 70 parts by weight were added to a $SiO_2$ based glaze (frit): 100 parts by weight, and then mixing/grinding the components into a slip.

Next, an enameling upper glaze was coated onto one of the surfaces of the resultant underlying enamel layer in a spraying manner. Thereafter, the resultant was fired at 750° C. to form a surface enamel layer 70 μm in thickness. In such a way, sample blackboards were produced. About some of the blackboards, the firing temperature was varied in the range of 700 to 780° C.

To 100 parts by weight of a transparent mat glaze (frit) having a composition shown in Table 1 were added clay: 5.5 parts by weight, sodium nitrite: 0.15 part by weight, silica: 0.5 part by weight, and water: 70 parts by weight, and further to the mixture were added $TiO_2$, $Sb_2O_5$ and NiO: 1 part by weight in total, $Cr_2O_3$: 8.2 parts by weight, Co and Cr: 10.0 parts by weight in total, and $Fe_2O_3$, CuO, CoO, MnO and so on: 0.1 part by weight in total as pigments. The components were mixed/grinded in a ball mill to yield a slip A. To 100 parts by weight of a titanium oxide glaze (frit) having a composition shown in Table 2 were added clay: 5.5 parts by weight, potassium chloride: 0.2 part by weight, sodium aluminate: 0.3 part by weight, and water: 54 parts by weight, and the components were mixed/grinded to yield a slip B. Thereafter, to the slip B: 100 parts by weight were added powder of titanium oxide coated particle: 20 parts by weight (a value converted to weight after the firing) together with water: 45 parts by weight. The components were mixed to prepare a slip C. The slip A and the slip C were blended with each other at a ratio of 3 to 1 to prepare each enameling upper glaze which was used in the present invention. In some of the glazes, the mixing ratio between the slip A and the slip C was varied. The titanium oxide coated particle powder was made of particles wherein surfaces of thin-plate-form mica particle were coated with titanium oxide, and had an average particle diameter of 20 μm and a titanium oxide coated area ratio of 30%. The average particle diameter was the 50% cumulated particle diameter measured by use of a laser diffraction type particle size distribution measuring device.

About a conventional example, to 100 parts by weight of a transparent mat glaze (frit) having the composition shown in Table 1 were added clay: 5.5 parts by weight, sodium nitrite: 0.15 part by weight, silica: 0.5 part by weight, and water: 70 parts by weight, and further to the mixture were added $TiO_2$, $Sb_2O_5$ and NiO: 0.5 part by weight in total, $Cr_2O_3$: 4.1 parts by weight, Co and Cr: 5.0 parts by weight in total, and $Fe_2O_3$, CuO, CoO, MnO and so on: 0.05 part by weight in total as pigments. The components were mixed/grinded in a ball mill to yield a slip D. The slip D was used as an enameling upper glaze, and firing at a firing temperature of 700° C. was carried out.

About the surface enamel layer of each of the resultant sample blackboards, the composition, the surface roughness, the color tone, the glossiness and the reflective characteristic were measured.

(1) Surface Roughness

In the measurement of the surface roughness, a contact type surface roughness meter was used to obtain the arithmetic average roughness Ra and the maximum height Rz in accordance with JIS B 0601-2001.

(2) Color Tone

The color tone was measured in accordance with JIS Z 8722-2000, and the color tone of each of the sample blackboards was represented in accordance with JIS Z 8721-1993.

(3) Glossiness

About the glossiness, the 75-degree mirror plane glossiness Gs (75°) was obtained in accordance with JIS Z 8741-1997.

(4) Reflective Characteristic

Figure 2:
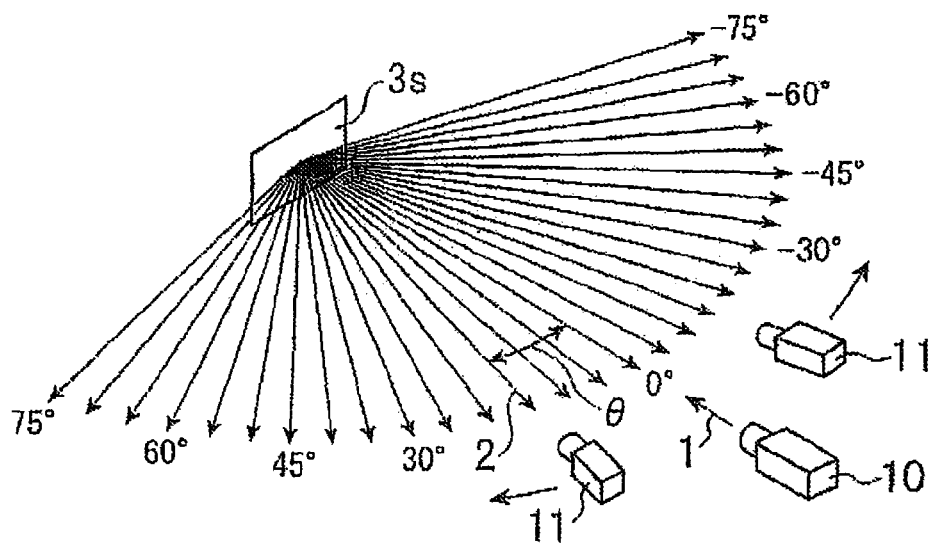
FIG. 2 is a schematic view showing a method for measuring reflective luminance.

As shown in FIG. 2, about the reflective characteristic, incident light 1 was radiated from a light source 10 perpendicularly to the center of a plate 3s to be measured, and a luminance meter 11 was used to measure the intensity of reflected light 2 (reflective luminance) at each of points shifted right-handedly and left-handedly in the range of 75°, respectively, from the central point at intervals of 5° on the arc of a single circle. The peak gain and the half gain were then obtained. About the peak gain, the following was defined as the peak gain: the ratio of the reflective luminance of the sample blackboard which was measured when light was radiated onto the blackboard to that of a standard whiteboard (perfect diffusion plate: a purely white plate, on which barium sulfate was baked) measured under the same conditions. About the reflective luminance, the reflective luminance at a viewing angle of 5° was used.

Examples of the reflective characteristics of the blackboards of the present invention (the present invention articles) and the conventional blackboard (the conventional article) are shown in FIG. 1. Along the vertical axis, the reflective luminance of the measured blackboards is represented by the percentage when the reflective luminance of the standard luminance (the peak) is set to 100%.

(3) Blackboard Function

Furthermore, characters were written with a chalk on each of the resultant sample blackboards in accordance with JIS B 6007, and then the easiness of the adhesion of the chalk and the easiness of the peeling of the chalk were judged. About the easiness of the adhesion of the chalk, the following were judged: whether or not unevenness was present in the lines when the lines were watched from a position 1 m apart from the blackboard surface; and whether or not the lines were clear when the lines were watched from a position 8 m apart therefrom. A case where no unevenness was present in the lines and further the lines were clear is represented by ⊚, a case where the clearness decreased slightly is represented by ○, and a case where unevenness was present in the lines or the lines were not clear is represented by X. In such a way, the chalk-character-recognizable property was evaluated. About the easiness of the peeling of the chalk, the characters written on the blackboard was rubbed with an eraser (made of felt), and then the blackboard was watched at a position 1 m apart from the blackboard. A case where a trace of the handwriting and erasion unevenness were not present is represented by ⊚, a case where traces of the handwriting remained slightly is represented by ○, and a case other than the two cases is represented by X. In this way, the chalk-character-erasable property was evaluated.

The results are shown in Tables 3 and 4.

TABLE 1

| | Composition (% by mass) | | | | | | | | |
|---|---|---|---|---|---|---|---|---|---|
| | $SiO_2$ | $Al_2O_3$ | $Na_2O + K_2O + Li_2O$ | $B_2O_3$ | $TiO_2$ | BaO | CaO | $F_2$ | Balance |
| Transparent mat glaze | 37 | 27 | 20 | 8 | 2 | 1 | 1 | 1 | 3 |

TABLE 2

| | Composition (% by mass) | | | | | | | |
|---|---|---|---|---|---|---|---|---|
| | $SiO_2$ | $Al_2O_3$ | $Na_2O + K_2O + Li_2O$ | $B_2O_3$ | $TiO_2$ | $P_2O_5$ | $F_2$ | Balance |
| Titanium oxide glaze | 35 | 3 | 18 | 13 | 22 | 2.5 | 4 | 2.5 |

TABLE 3

| | No. | Composition (% by mass) | | | | | | | | | Color tone adjusting pigment | Titanium oxide coated particles |
|---|---|---|---|---|---|---|---|---|---|---|---|---|
| | | $SiO_2$ | $Al_2O_3$ | $Na_2O + K_2O + Li_2O$ | $B_2O_3$ | $TiO_2$ | $F_2$ | CaO | BaO | Balance | | |
| Surface enamel layer | a | 31 | 15 | 15 | 8 | 12 | 2 | 0.4 | 0.4 | 16.2 | 8.2 | 8.4 |
| | b | 31 | 18 | 15 | 7 | 9 | 2 | 0.5 | 0.5 | 17.0 | 10.6 | 5.6 |
| | c | 31 | 19 | 16 | 7 | 7 | 1 | 0.6 | 0.6 | 17.8 | 11.9 | 4.2 |
| | d | 31 | 20 | 16 | 7 | 6 | 1 | 0.6 | 0.6 | 17.8 | 12.6 | 3.3 |
| | e | 35 | 25 | 17 | 7 | 0.3 | 1 | 0.9 | 0.9 | 12.9 | 8.3 | — |

TABLE 4

| Blackboard No. | Surface enamel layer No. | Firing temperature °C. | Color tone | | | Surface roughness | | Glossiness | Chalk-character-recognizable property | Chalk-character-erasable property | Reflective characteristic | | Notes |
|---|---|---|---|---|---|---|---|---|---|---|---|---|---|
| | | | H (Hue) | V (Brightness) | C (Chromaticness) | Ra μm | Rz μm | Gs (75°) | | | Peak gain | Half gain | |
| 1 | a | 750 | 7.1G | 6.1 | 2.9 | 2.3 | 16.2 | 18 | ○ | ◎ | 0.743 | 16.2 | The present invention example |
| 2 | b | 750 | 7.0G | 5.3 | 3.3 | 2.2 | 15.5 | 15 | ◎ | ◎ | 0.414 | 21.8 | The present invention example |
| 3 | c | 750 | 6.2G | 5.0 | 3.4 | 1.9 | 12.0 | 14 | ◎ | ◎ | 0.368 | 22.0 | The present invention example |
| 4 | d | 750 | 5.5G | 4.6 | 3.4 | 1.9 | 12.7 | 14 | ◎ | ◎ | 0.313 | 23.1 | The present invention example |
| 5 | c | 730 | 6.2G | 5.2 | 8.2 | 1.8 | 24.0 | 5.8 | ◎ | ○ | 0.285 | 37.9 | The present invention example |
| 6 | c | 740 | 8.3G | 5.1 | 2.9 | 2.1 | 19.1 | 9.2 | ◎ | ◎ | 0.381 | 29.0 | The present invention example |
| 7 | c | 760 | 4.5G | 5.2 | 1.9 | 1.5 | 15.6 | 17 | ◎ | ◎ | 0.543 | 21.1 | The present invention example |
| 8 | c | 780 | 7.5G | 5.6 | 1.7 | 1.4 | 14.9 | 23 | ◎ | ◎ | 0.768 | 17.2 | The present invention example |
| 9 | e | 700 | 2.7G | 3.4 | 1.9 | 1.3 | 18.5 | 15 | ◎ | ◎ | 0.220 | 22.8 | Conventional example |

The present invention examples each maintained a chalk-character-recognizable property and a chalk-character-erasable property equivalent to those of the conventional blackboard to keep an excellent blackboard function, and further gave a peak gain of 0.28 or more to exhibit an excellent reflective characteristic. Thus, when images are projected thereon, the blackboards are blackboards excellent in projected-image-recognizable property and suitable for image-projection. The comparative example outside the scope of the present invention had a lowered blackboard function of chalk-character-recognizable property and chalk-character-erasable property, or had a poor reflective characteristic with declined the projected-image-recognizable property thereof.

The invention claimed is:

1. A process for producing a projection blackboard, comprising:
   coating a surface of a metallic substrate with an enameling lower glaze;
   firing the coating to form an underlying enamel layer;
   coating an underlying enamel layer with an enameling upper glaze in which at least titanium dioxide coated particles are blended into a transparent matte glaze, and at least one of black pigment, green pigment, and brown pigment or a combination of two or more thereof, as the pigment(s), is/are further added to the transparent matte glaze in accordance with a color tone of the blackboard; and firing at 400 to 850° C. to form a surface enamel layer having a color tone having a brightness V according to JIS Z 8721-1993 of from 3.0 to 7.0, a surface roughness Rz according to JIS B 0601-2001 in a range of 5 to 25 μm, and a peak gain of 0.28 or more.

2. The process for producing a projection blackboard according to claim 1, wherein said enameling upper glaze is a glaze into which a titanium dioxide glaze or further a transparent gloss glaze is further blended.

3. The process for producing a projection blackboard according to claim 2, wherein said titanium dioxide coated particles are particles wherein surfaces of mica particles are coated with titanium dioxide.

4. The process for producing a projection blackboard according to claim 2, wherein said metallic substrate is a cold-rolled steel sheet, an aluminum plated steel sheet, or a Zn—Al alloy plated steel sheet.

5. The process for producing a projection blackboard according to claim 1, wherein said titanium dioxide coated particles are particles wherein surfaces of mica particles are coated with titanium dioxide.

6. The process for producing a projection blackboard according to claim 5, wherein said metallic substrate is a cold-rolled steel sheet, an aluminum plated steel sheet, or a Zn—Al alloy plated steel sheet.

7. The process for producing a projection blackboard according to claim 1, wherein said metallic substrate is a cold-rolled steel sheet, an aluminum plated steel sheet, or a Zn—Al alloy plated steel sheet.

8. The process for producing a projection blackboard according to claim 1, wherein the surface enamel layer has a color tone with a brightness according to JIS Z 8721-1993 being from 4.0 to 6.0.

9. The process for producing a projection blackboard according to claim 1, wherein the surface enamel layer has a surface roughness according to JIS B 0601-2001 of from 10 to 22 μm.

10. The process for producing a projection blackboard according to claim 1, wherein the surface enamel layer has a peak gain of 0.5 to 1.0.

11. The process for producing a projection blackboard according to claim 1, wherein the surface enamel layer has a 75-degree mirror plane glossiness according to JIS Z 8741-1997 of 1% TO 30%.

12. The process for producing a projection blackboard according to claim 1, wherein the surface enamel layer contains 2% to 40% by mass of the titanium dioxide coated particles.

13. The process for producing a projection blackboard according to claim 1, wherein the titanium dioxide coated particles have an average particle diameter of 5 μm to 80 μm.

14. A process for producing a projection blackboard, comprising:
coating a surface of a metallic substrate with an enameling upper glaze in which at least titanium dioxide coated particles are blended into a transparent matte glaze, and at least one of black pigment, green pigment, and brown pigment or a combination of two or more thereof, as the pigment(s), is/are further added to the transparent matte glaze in accordance with a color tone of the blackboard; and
firing the coating at 400 to 850° C. to form a surface enamel layer having a color tone having a brightness V according to JIS Z 8721-1993 of from 3.0 to 7.0, a surface roughness Rz according to JIS B 0601-2001 in a range of 5 to 25 μm, and a peak gain of 0.28 or more.

15. The process for producing a projection blackboard according to claim 14, wherein said enameling upper glaze is a glaze into which a titanium dioxide glaze or further a transparent gloss glaze is further blended.

16. The process for producing a projection blackboard according to claim 15, wherein said titanium dioxide coated particles are particles wherein surfaces of mica particles are coated with titanium dioxide.

17. The process for producing a projection blackboard according to claim 15, wherein said metallic substrate is a cold-rolled steel sheet, an aluminum plated steel sheet, or a Zn—Al alloy plated steel sheet.

18. The process for producing a projection blackboard according to claim 14, wherein said titanium dioxide coated particles are particles wherein surfaces of mica particles are coated with titanium dioxide.

19. The process for producing a projection blackboard according to claim 18, wherein said metallic substrate is a cold-rolled steel sheet, an aluminum plated steel sheet, or a Zn—Al alloy plated steel sheet.

20. The process for producing a projection blackboard according to claim 14, wherein said metallic substrate is a cold-rolled steel sheet, an aluminum plated steel sheet, or a Zn—Al alloy plated steel sheet.

* * * * *